(12) United States Patent
Kanade et al.

(10) Patent No.: US 8,107,169 B2
(45) Date of Patent: Jan. 31, 2012

(54) PROGRAMMABLE LIGHT SOURCE

(76) Inventors: Udayan Kanade, Pune (IN); Manohar Joshi, Los Angeles, CA (US)

( * ) Notice: Subject to any disclaimer, the term of this patent is extended or adjusted under 35 U.S.C. 154(b) by 0 days.

(21) Appl. No.: 12/663,045

(22) PCT Filed: Jun. 5, 2008

(86) PCT No.: PCT/IB2008/052220
§ 371 (c)(1),
(2), (4) Date: Dec. 4, 2009

(87) PCT Pub. No.: WO2008/149310
PCT Pub. Date: Dec. 11, 2008

(65) Prior Publication Data
US 2010/0172014 A1    Jul. 8, 2010

(30) Foreign Application Priority Data
Jun. 5, 2007  (IN) .......................... 1059/MUM/2007

(51) Int. Cl.
G02B 27/12    (2006.01)
(52) U.S. Cl. ...................................... 359/640; 359/638

(58) Field of Classification Search ................... 359/800, 359/496, 629, 636, 638, 640
See application file for complete search history.

(56) References Cited

U.S. PATENT DOCUMENTS

| | | |
|---|---|---|
| 5,090,807 A | 2/1992 | Tai |
| 5,121,239 A | 6/1992 | Post |
| 6,781,691 B2 | 8/2004 | MacKinnon |
| 7,148,470 B2 | 12/2006 | Rains, Jr. |
| 2008/0055720 A1 * | 3/2008 | Perkins et al. ................ 359/486 |

FOREIGN PATENT DOCUMENTS

| | | |
|---|---|---|
| DE | 10346313 A1 | 5/2005 |
| WO | 2006/017129 A2 | 2/2006 |

* cited by examiner

Primary Examiner — Alicia M Harrington

(57) ABSTRACT

A programmable spectrum light source is disclosed. In one embodiment, the programmable light source comprises a light source, a spectrum separation system that splits the light into its constituent spectral components, a light modulator that modulates the spectral components according to a required spectral envelope and a light recombination system that recombines the shaped spectral components to produce light with a required spectrum.

16 Claims, 5 Drawing Sheets

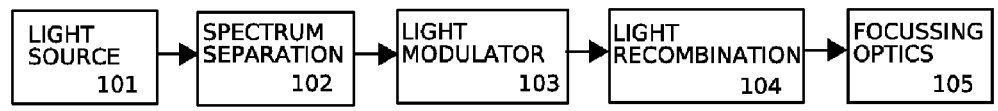
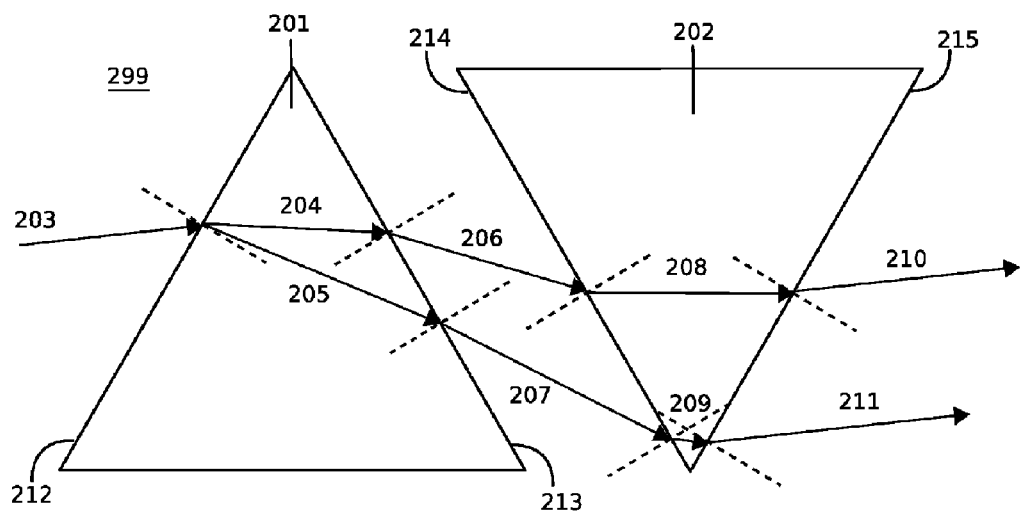
FIG 2
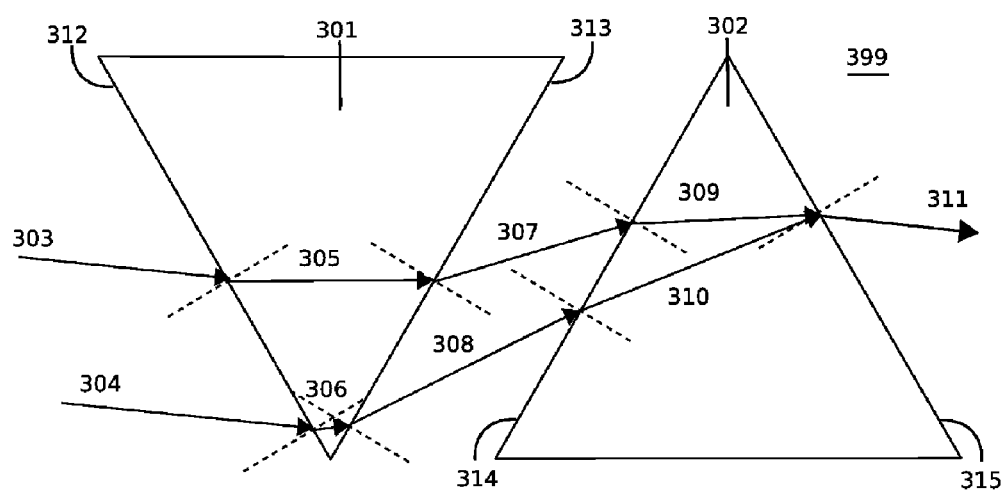
FIG 3

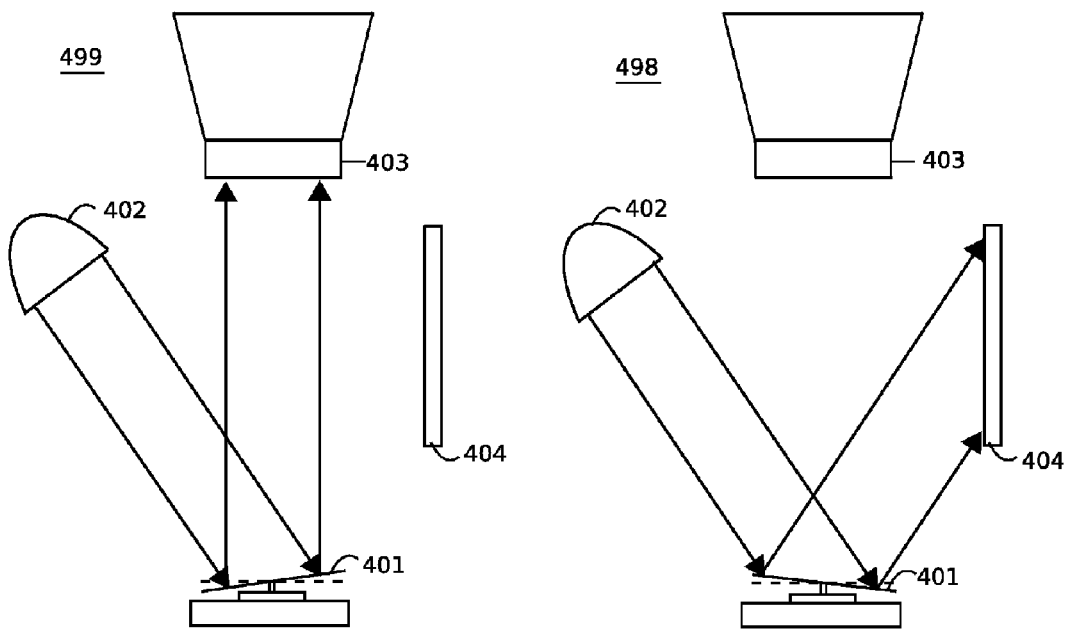
FIG 4A   FIG 4B
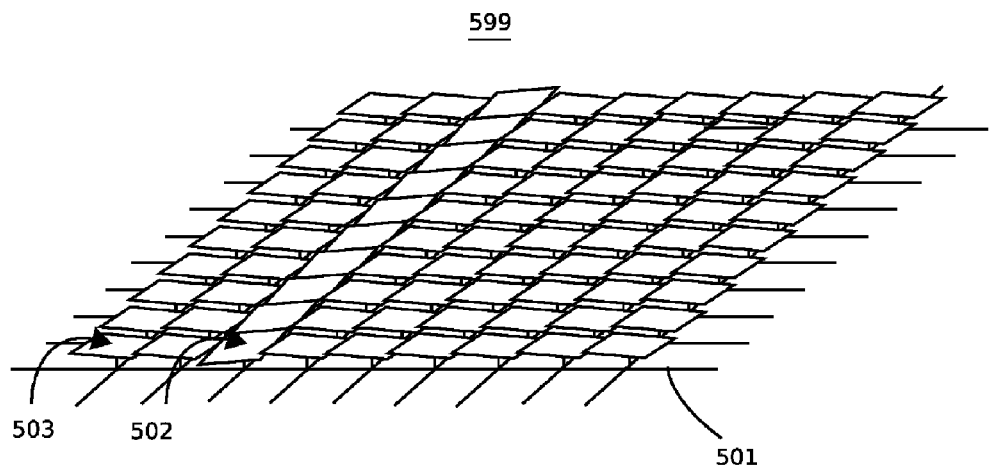
FIG 5

PROGRAMMABLE LIGHT SOURCE

This patent claims priority from provisional patent no. 1059/MUM/2007 titled "A programmable light source" filed in Mumbai, India on 5 Jun. 2007.

TECHNICAL FIELD

The present invention relates to a programmable light source. More particularly, the present invention relates to a light source whose spectrum can be programmed as required.

BACKGROUND ART

Light sources that can change the spectrum of light emitted by them find uses in theater, movie, photography, architectural lighting and other industries and home appliances. Many prior art systems work as light sources with programmable spectra. For example, some systems use a set of changeable color filters in front of a light source. Such systems suffer from a limited range of producible spectra. Other systems use a set of light sources of different colors (such as red, green and blue). These systems too suffer from a limited range of producible spectra. Even though bounced off a white object, this range of spectra covers a large range of colors detected by the human eye, light of different spectra but same detectable color interact with objects of different colors differently. For example, even though an artificial light source may look the same color as another natural light source, it will not light a scene in the same way as the natural light source, if the artificial light source does not have the same spectrum as the natural light source. Thus, it will fail to simulate the natural light source.

Thus, there is a need for a programmable light source which can produce light of a required spectrum.

SUMMARY

A programmable spectrum light source is disclosed. In one embodiment, the programmable light source comprises a light source, a spectrum separation system in front of the light source that splits the light into its constituent spectral components, a light modulator that modulates the spectral components according to a required spectral envelope and light recombination system that recombines the shaped spectral components to produce light with a required spectrum.

The above and other preferred features, including various details of implementation and combination of elements are more particularly described with reference to the accompanying drawings and pointed out in the claims. It will be understood that the particular methods and systems described herein are shown by way of illustration only and not as limitations. As will be understood by those skilled in the art, the principles and features described herein may be employed in various and numerous embodiments without departing from the scope of the invention.

BRIEF DESCRIPTION OF DRAWINGS

The accompanying drawings, which are included as part of the present specification, illustrate the presently preferred embodiment and together with the general description given above and the detailed description of the preferred embodiment given below serve to explain and teach the principles of the present invention.

FIG. 1 illustrates a block diagram of an exemplary programmable light source system according to one embodiment of the present invention.

FIG. 2 illustrates an exemplary apparatus that splits light into its constituent spectrum using prisms, according to one embodiment.

FIG. 3 illustrates an exemplary apparatus which recombines spectral components of light using prisms, according to one embodiment.

FIG. 4A illustrates a block diagram of an exemplary light switch formed by a single mirror inside a micro-mirror device when the switch is in the 'ON' state, according to one embodiment.

FIG. 4B illustrates a block diagram of an exemplary light switch formed by a mirror inside a micromirror device when the switch is in the 'OFF' state, according to one embodiment.

FIG. 5 illustrates an exemplary micromirror array device which is used for shaping the spectrum of a light beam as per a required spectral envelope, according to one embodiment.

DETAILED DESCRIPTION

Figure 6:
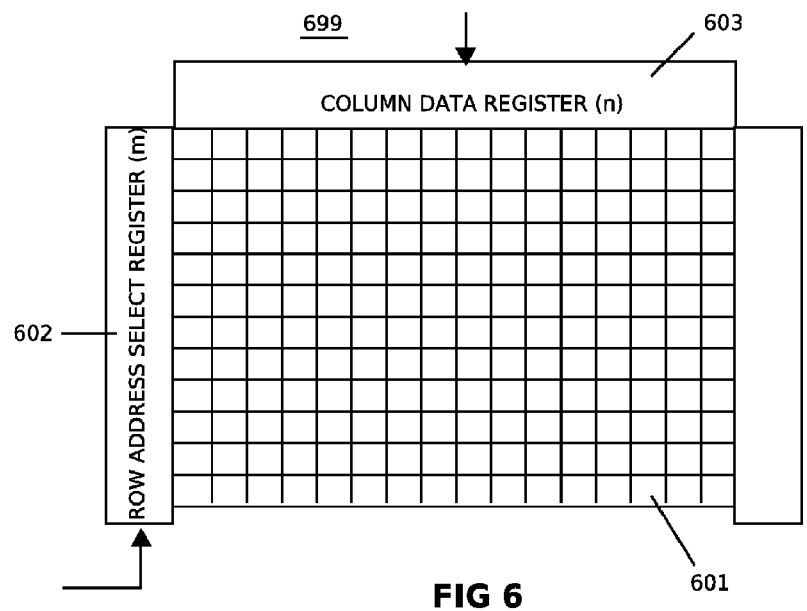
FIG. 6 illustrates a block diagram of an exemplary memory array which controls the micromirror array, according to one embodiment.

A programmable spectrum light source is disclosed. In one embodiment, the programmable light source comprises a light source, a spectrum separation system in front of the light source that splits the light into its constituent spectral components, a light modulator that modulates the spectral components according to a required spectral envelope and light recombination system that recombines the shaped spectral components to produce light with a required spectrum.

FIG. 1 illustrates a block diagram of an exemplary programmable light source system 199 according to one embodiment of the present invention. The setup comprises a light source 101. The light source 101 may be a carbon arc lamp, mercury arc lamp, xenon arc lamp, incandescent lamp, fluorescent lamp, a light emitting diode (LED) or any light source. Light from the light source 101 is incident on a spectrum separator 102 which splits incident light into its constituent spectral components. Spectrum separator 102 may be a prism, a parallel prism apparatus or a diffraction grating. Spectral components of light from spectrum separator 102 are incident on light modulator 103 which modulates each spectral component according to a required spectral envelope. Light modulator 103 transmits or partially transmits each spectral component to light recombination device 104. Light modulator 103 may comprise a liquid crystal display (LCD) panel, a mirror or mirrors, a patterned transparency, a micromirror device like a digital mirror device (DMD) or an electrowetting display. After, the light spectrum is shaped by the light modulator 103, the spectral components are recombined by a recombination device 104. Light recombination device 104 may be a parallel prism apparatus, an integrating cavity or a diffuser. In an embodiment, the combined light beam is then focused onto an object to be illuminated using focusing system 105. Focusing system 105 may comprise devices such as lenses, Fresnel lenses, prism sheets, collimator sheets, reflectors, parabolic reflectors and elliptical reflectors. The combined light beam has a spectrum which is shaped according to a required spectral envelope. The system 199 is a light source which emits light with a programmable spectrum. In another embodiment, the focusing system 105 is not incorporated in the system 199.

Spectrum Separation

FIG. 2 illustrates an exemplary apparatus 299 that splits light into its constituent spectrum using prisms, according to an embodiment. Triangular prisms 201 and 202 are placed such that the face 212 of prism 201 is parallel to face 215 of prism 202 and face 213 of prism 201 is parallel to face 214 of prism 202. Prism 201 is inverted with respect to prism 202. Light beam 203, which has a particular spectrum, is incident on face 212 of prism 201. Light beam 203 undergoes refraction at the prism face 212 and splits into its constituent spectral components. Two exemplary spectral components 204 and 205 traveling at different speeds in the prism medium are depicted. Spectral component 205 travels at a slower speed than spectral component 204. Thus spectral component 205 gets dispersed more than spectral component 204. All components of light get dispersed by varying amounts. Components 204 and 205 emerge out from the prism face 213 as components 206 and 207 after undergoing refraction at the prism face 213. Spectral components 206 and 207 diverge away from each other as they travel towards the prism face 214. Spectral components 206 and 207 get refracted at the prism face 214 and enter the prism 202 as light rays 208 and 209 respectively. Spectral components 208 and 209 further disperse as they travel and get refracted at the prism face 215 and emerge out as rays 210 and 211 respectively. Spectral components 210 and 211 emerge out as parallel light rays. All intermediate components emerge out parallel to one another. Further, all spectral components between the spectral components 210 and 211 emerge out parallel to the incident light ray 203. The parallel prism apparatus of system 299 splits incident light beam into its spectral components such that the spectral components emerge out parallel to each other. The splitting of a light beam into its constituent spectral components is henceforth referred to as 'spectrum separation'.

In one embodiment, the apparatus 299 does not use prism 202. Light beam 203 is split into its constituent spectral components by prism 201 alone.

In one embodiment, the apparatus 299 comprises several prisms arranged such that all prism bases are parallel to each other and alternate prisms are inverted.

In one embodiment, light is split into its spectral components using direct vision prisms.

In one embodiment, light is split into its constituent spectral components by using a diffraction grating. The diffraction grating may be a reflecting or transparent material. It may be realized as fine parallel and equally spaced grooves or rulings on a material surface. When light is incident on a diffraction grating, diffractive and mutual interference effects occur, and light is reflected or transmitted in discrete directions. Dispersive properties of the gratings permit the use of gratings for splitting incident light into constituent spectral components.

Light Recombination

FIG. 3 illustrates an exemplary apparatus 399 which recombines spectral components of light using prisms, according to an embodiment. Triangular prisms 301 and 302 are placed such that the face 312 of prism 301 is parallel to face 315 of prism 302 and face 313 of prism 301 is parallel to face 314 of prism 302. Prism 301 is inverted with respect to prism 302. A parallel beam of light is incident on face 312 of prism 301. Light rays 303 and 304 depict the terminal rays in the incident beam of light, having different wavelengths. Light rays 303 and 304 undergo refraction at face 312 of prism 301 and enter the prism as rays 305 and 306 respectively. Light rays 305 and 306, being of different wavelengths, get refracted at different angles and no longer remain parallel inside the prism. Light rays 305 and 306 undergo refraction at face 313 of prism 301 and emerge out of the prism as light rays 307 and 308. Light rays 307 and 308 are further incident on face 314 of prism 302 where they undergo refraction and enter the prism 302 as rays 309 and 310. Light rays 309 and 310 converge at the face 315 of prism 302 and emerge out of the prism as a single beam 311 after refraction at face 315. Light beam 311 comprises the recombination of all spectral components incident on the face 312 of prism 301. The parallel prism apparatus 399 recombines spectral components into a single beam of light.

In one embodiment, the apparatus 399 does not use prism 302. Spectral components are combined by prism 301 alone.

In one embodiment, the apparatus 399 comprises several prisms arranged such that all prism bases are parallel to each other and alternate prisms are inverted.

In one embodiment, an apparatus for recombining spectral components into a single beam of light is a light integrating cavity. A light integrating cavity comprises a hollow cavity with its interior coated such that it becomes a diffuse high reflectance surface. The cavity has small openings for light entry and exit. Spectral components entering the integrating cavity undergo multiple diffuse reflections and get mixed. Spectral components get recombined into a single light beam at the exit opening of the integrating cavity.

In one embodiment, spectral components are recombined using direct vision prisms.

In one embodiment, spectral components are recombined by a sheet which diffuses light.

Light Modulators for Spectrum Shaping

A light beam can be split into spectral components using various methods described above. Spectral components can be modulated so that the light attains a required spectrum.

Modulation of spectral components may be achieved using light modulators such as LCD panels, mirrors, patterned transparencies, electrowetting displays or micromirror devices like DMDs. In an embodiment, a patterned transparency is a transparent sheet with light absorbing areas. The light absorbing areas may be painted or printed light absorbing dyes. Different light absorbing areas may be arranged to have different absorptivities by controlling the amount or concentration of the dye or the size of printed spots. Light absorbing areas diminish the transmittance of the transparency in that area by an amount corresponding to the absorptivity of that area. This modulates the light of wavelengths corresponding to the particular area. Thus spectral modulation is achieved. In another embodiment, a patterned transparency is a transparent sheet with light reflecting areas.

A micromirror device such as a DMD is a reflective light modulator which comprises an array of small controllable mirrors that are mounted on a structure with hinges. The operation of a DMD is explained below.

FIG. 4A illustrates a block diagram of an exemplary light switch 499 formed by a single mirror inside a micro-mirror device when the switch is in the 'ON' state, according to an embodiment. Mirror 401 is placed on a hinge structure. A control mechanism is capable of rotating the mirror about its hinge. A light recombination system 403 is placed at a particular position relative to the mirror. The light recombination system may comprise integrating cavities, diffusers, prisms etc. A light absorbing apparatus 404 is placed at another particular position relative to the mirror. In one state of the mirror 401, the control mechanism rotates the mirror such that the light from the light source 402 is reflected by the mirror towards the light recombination system 403. This state of the mirror is henceforth referred to as the 'ON' state of the mirror.

FIG. 4B illustrates a block diagram of an exemplary light switch 498 formed by a mirror inside a micromirror device when the switch is in the 'OFF' state, according to an embodiment. In this particular state, the control mechanism rotates the mirror 401 such that light from the light source 402 is reflected by the mirror onto the light absorbing apparatus 404. Light from the light source gets absorbed by the light absorbing apparatus 404 and does not fall on the light recombination system 403. This state of the mirror is henceforth referred to as the 'OFF' state of the mirror.

In one embodiment, the intensity of light reflected by a light switch into the light recombination system is controlled by binary pulse width modulation. The binary pulse width modulation scheme divides the total illumination time into small time slots. The light switch is kept in the 'ON' and 'OFF' states in different time slots such that light of a required average intensity enters the light recombination system.

In an alternate embodiment, the time slots are grouped into field times. Each field time is illuminated according to a binary word. Each bit of the word represents time duration for which the light switch is in the 'ON' state or 'OFF' state within a time slot in the field time. As an example, in an N bit binary word, the kth bit represents a duration of $2^k/(2^N-1)$ th part of the field time, where ^ denotes exponentiation.

FIG. 5 illustrates an exemplary micromirror array device 599 which is used for shaping the spectrum of a light beam as per a required spectral envelope, according to an embodiment.

A light beam decomposed into its spectral components is incident on the micromirror array 501 in such a way that the spectral components lie along the columns of the micromirror array. The micro-mirror array is configured to switch an entire column in the 'ON' state or the 'OFF' state. Column 502 is an exemplary column of micromirrors which is in the 'OFF' state. Spectral component falling on column 502 will not be directed into the light integration system. Column 503 is an exemplary column which is in the 'ON' state. Spectral component falling along the column 503 is directed to the light integration system. Further, binary pulse width modulation is used so that the intensity of light reflected from a particular column may be controlled. The system 599 modulates the intensity of each spectral component independently, according to a required spectral envelope.

FIG. 6 illustrates a block diagram of an exemplary memory array 699, which controls a micromirror array, according to an embodiment. An array of micromirrors mounted on a structure of hinges is controlled by a memory array 601. The memory array 601 has m rows and n columns corresponding to m rows and n columns of micromirrors on the micromirror array. Each memory element in the memory array controls a particular micromirror in the micromirror array. A micromirror is switched into the 'ON' state or the 'OFF' state as a function of the state of the memory element controlling it. The entire m×n elements of the memory array are filled with data using data lines present on the columns and address lines on the rows. In one embodiment, data is filled one row at a time, by selecting a row using the row address select register 602 and feeding data via the column data register. In another embodiment, all rows are selected at once using the row address select register 602 and data is filled via the column data register. Each bit in the column data register controls a micromirror column which modulates a particular spectral component. In an embodiment, the row address select register 602 is a shift register, and all the rows are selected at once by shifting in a pattern which selects all rows.

EMBODIMENTS

Figure 7:
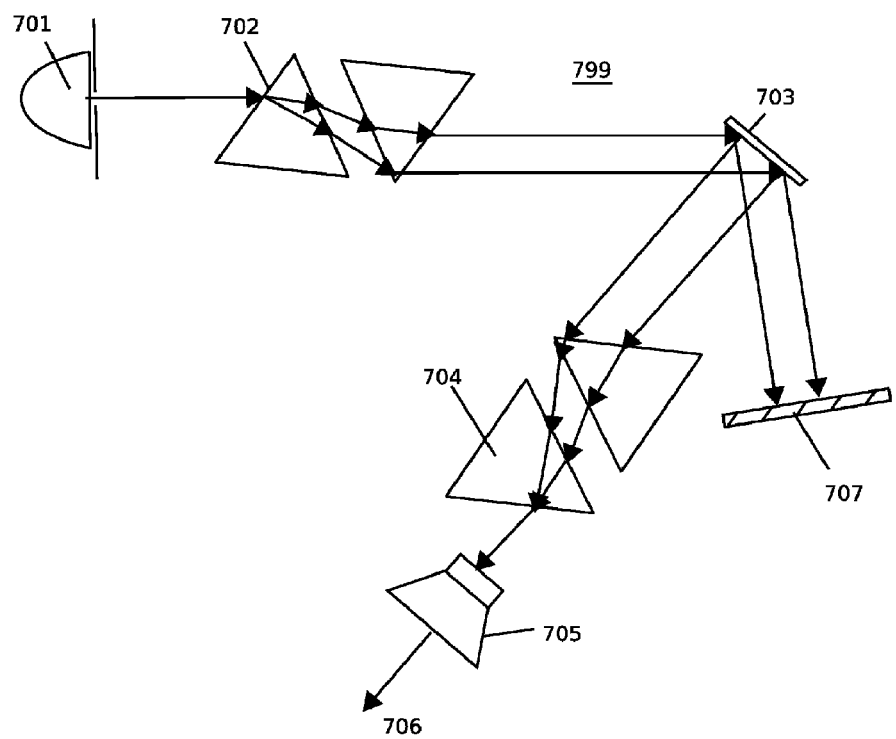
FIG. 7 illustrates a block diagram of an exemplary programmable light source comprising a micromirror device as light modulator, a parallel prism apparatus for spectrum separation and a parallel prism apparatus for light recombination according to one embodiment of the present invention.

FIG. 7 illustrates a block diagram of an exemplary programmable light source 799 comprising a micromirror device as light modulator, a parallel prism apparatus for spectrum separation and a parallel prism apparatus for light recombination according to an embodiment of the present invention. A beam of light from the light source 701 is directed onto a parallel prism apparatus 702. The beam of light from 701 is separated into its spectral components by the parallel prism apparatus 702. A light beam comprising separated spectral components is incident on a micromirror device 703 which is used as a spectrum shaping device as explained above. The micromirror device modulates the intensity of each spectral component by switching columns of mirrors. In one state of a column, the corresponding spectral component is reflected towards the light recombination apparatus 704. In another state, the spectral component is reflected onto a light absorber 707 which absorbs it. In this manner, the spectral components get modulated so that the combined spectrum attains a required spectral envelope. The shaped spectral components are recombined by a parallel prism apparatus 704. The recombined light beam is then focused on the required object using focusing optics assembly 705. Light beam 706 has a required spectrum. Thus apparatus 799 works as a light source with a programmable spectrum.

In an embodiment, a single prism is used for spectrum separation.

In an embodiment, a diffraction grating is used for spectrum separation.

In an embodiment, a diffuser sheet is used for light recombination.

Figure 8:
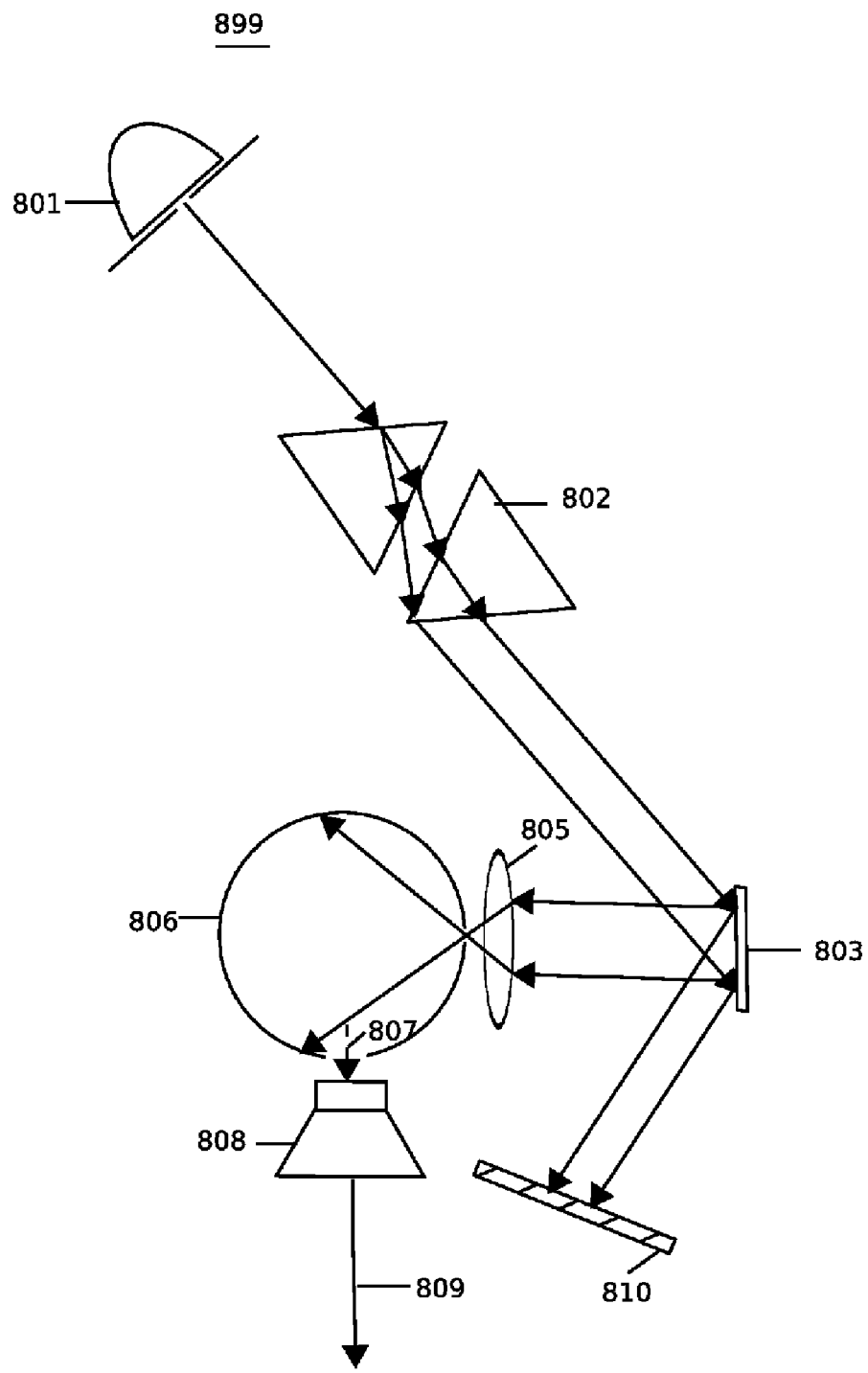
FIG. 8 illustrates a block diagram of an exemplary programmable light source comprising a micromirror device as a light modulator, prism apparatus for spectrum separation and integrating cavity for light recombination according to an embodiment of the present invention.

FIG. 8 illustrates a block diagram of an exemplary programmable light source 899 comprising a micromirror device as a light modulator, prism apparatus for spectrum separation and integrating cavity for light recombination according to an embodiment of the present invention. A beam of light from the light source 801 is directed onto a parallel prism apparatus 802. The beam of light incident on the parallel prism apparatus 802 is separated into its spectral components. A light beam comprising separated spectral components is incident on the micromirror device 803 which is used as a spectrum shaping device as explained above. The micromirror device 803 modulates the intensity of each spectral component by switching columns of mirrors. In one state of a column, the corresponding spectral component is reflected towards the light recombination assembly. In another state, the spectral component is reflected onto a light absorber 810 which absorbs it. In this manner, the spectral components get modulated so that the combined spectrum attains a required spectral envelope. The shaped spectral components are focused into an integration cavity 806 using a lens assembly 805. The integrating cavity mixes the shaped spectral components and gives out a recombined beam of light 807. Light beam 807 is focused onto the required object using focusing optics assembly 808. Light beam 809 has a required spectrum. Thus apparatus 899 works as a light source with a programmable spectrum.

In an embodiment, a single prism is used for spectrum separation.

In an embodiment, a diffraction grating is used for spectrum separation.

In an embodiment, a diffuser sheet is used for light recombination.

Figure 9:
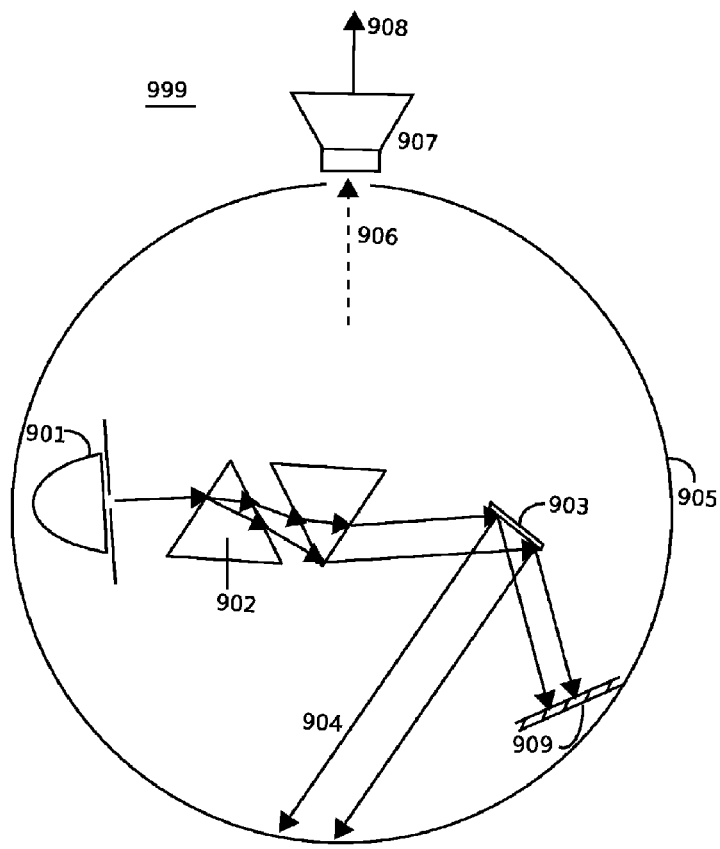
FIG. 9 illustrates a block diagram of an exemplary programmable light source comprising a micromirror device as a light modulator, prism apparatus for spectrum separation and an integrating cavity for light recombination according to one embodiment of the present invention.

FIG. 9 illustrates a block diagram of an exemplary programmable light source 999 comprising a micromirror device as a light modulator, prism apparatus for spectrum separation and an integrating cavity for light recombination according to an embodiment of the present invention. A beam of light from the light source 901 is directed onto a parallel prism apparatus 902. The beam of light incident on the parallel prism apparatus 902 is separated into its spectral components. A light beam comprising separated spectral components is incident on the micromirror device 903 which is used as a spectrum shaping device as explained above. The micromirror device modulates the intensity of each spectral component by switching columns of mirrors. In one state of a column, the corresponding spectral component is reflected towards the light recombination apparatus 905. In another state, the spectral component is reflected onto a light absorber 909 which absorbs it. In this manner, the spectral components get modulated so that the combined spectrum attains a required spectral envelope. The shaped spectral components are integrated using an integration cavity 905. Integration cavity 905 encompasses the other components of programmable light source 999. The integration cavity mixes the shaped spectral components and gives out a recombined beam of light 906. Light beam 906 is focused onto the required object using focusing optics assembly 907. Light beam 908 has a spectrum shaped according to a required spectral envelope. Thus apparatus 999 works as a light source with a programmable spectrum.

In an embodiment, a single prism is used for spectrum separation.

In an embodiment, a diffraction grating is used for spectrum separation.

Figure 10:
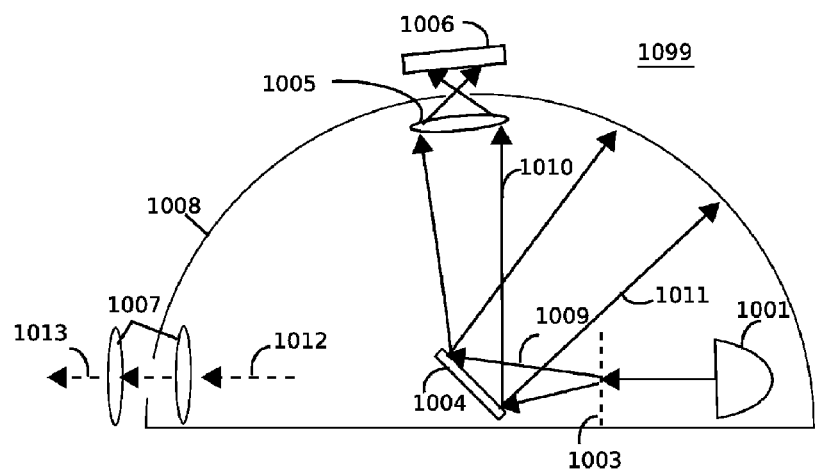
FIG. 10 illustrates a block diagram of an exemplary programmable light source comprising a micromirror device as a light modulator, diffraction grating for spectrum separation and an integrating cavity for light recombination according to one embodiment of the present invention.

FIG. 10 illustrates a block diagram of an exemplary programmable light source 1099 comprising a micromirror device as a light modulator, diffraction grating for spectrum separation and an integrating cavity for light recombination according to an embodiment of the present invention. A beam of light from the light source 1001 is directed onto a diffraction grating 1003. The beam of light incident on the diffraction grating 1003 is separated into its spectral components. A light beam 1009 comprising separated spectral components is incident on the micromirror device 1004 which is used as a spectrum shaping device as explained above. The micromirror device modulates the intensity of each spectral component by independently switching columns of mirrors. In one state of a column, the corresponding spectral component is reflected towards the integrating cavity 1008. In another state of the micromirror column, the spectral component is reflected onto a light absorber 1006 via a lens 1005. The light absorber 1006 absorbs all light incident on it. The spectral components 1009 get modulated so that the combined spectrum attains a required spectral envelope. The shaped spectral components 1011 are integrated using an integration cavity 1008. Integration cavity 1008 encompasses the other components of programmable light source 1099. The integration cavity 1008 mixes the shaped spectral components and gives out a recombined beam of light 1012. Light beam 1012 is focused onto an object under illumination using focusing optics assembly 1007. Light beam 1013 has the required spectrum. Thus, apparatus 1099 works as a light source with a programmable spectrum.

In an embodiment, a single prism is used for spectrum separation.

In an embodiment, a diffraction grating is used for spectrum separation.

Increasing Efficiency

An embodiment of the present invention shapes the spectrum of light by selectively reflecting it towards a light recombination system or towards a light absorber. The light absorber absorbs all light incident on it. This light absorber may convert the light incident on it into usable forms of energy such as electrical energy. This may be achieved by a light to electrical energy conversion mechanism such as a photovoltaic cell. The electrical energy recovered by this means may be fed back to the light source for generating light.

In another embodiment, the light absorber is the same black body as that used as the filament of the light source. The black body absorbs light incident on it, and converts it to heat. This heat energy is given out in the form of light.

Uses

One use of the present apparatus is as a programmable light source for theatre lighting.

Another use of the present apparatus is as a programmable light source for movie lighting.

Another use for the present apparatus is as a light source for photography.

The present apparatus may also be used for lighting applications such as home lighting, architectural lighting, home theatre lighting.

A programmable light source is disclosed. It is understood that the embodiments described herein are for the purpose of elucidation and should not be considered limiting the subject matter of the present patent. Various modifications, uses, substitutions, recombinations, improvements, methods of productions without departing from the scope or spirit of the present invention would be evident to a person skilled in the art.

The invention claimed is:

1. An apparatus comprising a light source, a spectrum separator, a light modulator, a light recombiner and a first focusing apparatus that focuses light from the light modulator into a light absorber, wherein
the light recombiner comprises an integrating cavity wherein at least one of the light source, the spectrum separator, the light modulator and the first focusing apparatus are placed inside the integrating cavity.

2. The apparatus of claim 1, wherein the spectrum separator comprises a prism.

3. The apparatus of claim 1, wherein the spectrum separator comprises at least two prisms.

4. The apparatus of claim 3, wherein the at least two prisms are arranged so that a first face of a first prism is parallel to a second face of a second prism and a second face of the first prism is parallel to a first face of the second prism, the first face of the first prism being a face on which light is incident, the first face of a second prism being a face on which light is incident, the second face of the first prism being a face from which light emerges from the first prism, the second face of the second prism being a face from which light emerges from the second prism.

5. The apparatus of claim 1, wherein the spectrum separator comprises a diffraction grating.

6. The apparatus of claim 1, wherein the light modulator comprises a liquid crystal display.

7. The apparatus of claim 1, wherein the light modulator comprises a mirror.

8. The apparatus of claim 1, wherein the light modulator comprises a fixed pattern transparency.

9. The apparatus of claim 8, wherein the fixed pattern transparency comprises light absorbing areas.

10. The apparatus of claim 8, wherein the fixed pattern transparency comprises light reflecting areas.

11. The apparatus of claim 1, wherein the light modulator comprises an electrowetting display.

12. The apparatus of claim 1, wherein the light modulator comprises more than one mirrors, each mirror being a reflector of light, each mirror being capable of being in a state such that it reflects light towards the light recombiner, each mirror being capable of being in a state such that it does not reflect light towards the light recombiner.

13. The apparatus of claim 1, wherein a second focusing apparatus focuses light from the light recombiner.

14. The apparatus of claim 1, wherein a second focusing apparatus focuses light from the light modulator into the light recombiner.

15. The apparatus of claim 1, wherein the light source, the spectrum separator, the light modulator and the first focusing apparatus are placed inside the integrating cavity.

16. The apparatus of claim 1, wherein the light absorber is placed outside the integrating cavity.

* * * * *